United States Patent [19]
Sato et al.

[11] Patent Number: 5,488,357
[45] Date of Patent: Jan. 30, 1996

[54] REMOTE CONTROLLING METHOD AND SYSTEM FEATURE STARTING METHOD AND CONTROLLING METHOD FOR AUDIO/VISUAL SYSTEM

[75] Inventors: Makoto Sato; Hiroshi Yamazaki, both of Kanagawa; Noriko Kotabe, Chiba; Yoshio Osakabe, Kanagawa; Yasuo Kusagaya; Shigeo Tanaka, both of Tokyo; Kouich Sugiyama; Akira Katsuyama, both of Kanagawa, all of Japan

[73] Assignee: Sony Corporation, Tokyo, Japan

[21] Appl. No.: 170,798

[22] Filed: Dec. 21, 1993

[30] Foreign Application Priority Data

Jan. 6, 1993 [JP] Japan .................................. 5-016727
Jan. 12, 1993 [JP] Japan .................................. 5-019578

[51] Int. Cl.$^6$ .................................................. H04Q 1/00
[52] U.S. Cl. ............................... 340/825.25; 340/825.24; 340/825.22; 340/825.69; 359/148; 348/734
[58] Field of Search .................. 340/825.22, 825.24, 340/825.25, 825.69, 825.72; 341/176; 359/142, 148; 348/734

[56] References Cited

U.S. PATENT DOCUMENTS 4,394,691 7/1983 Amano ..................................... 359/148
4,718,112 1/1988 Shinoda .................................. 359/148
4,817,203 3/1989 Tsurumoto .............................. 348/734
4,855,730 8/1989 Venners .............................. 340/825.24
5,307,193 4/1994 Van Zeeland ........................... 359/142

FOREIGN PATENT DOCUMENTS

395097 10/1990 European Pat. Off. .
423739 4/1991 European Pat. Off. .
457673 11/1991 European Pat. Off. .
510739 10/1992 European Pat. Off. .
535749 4/1993 European Pat. Off. .
371749 6/1993 European Pat. Off. .

*Primary Examiner*—Brian Zimmerman
*Attorney, Agent, or Firm*—Jay H. Maioli

[57] ABSTRACT

A remote control method for an audio/visual system which can perform protection during execution of a system feature and is convenient in use is applied to an audio/visual system wherein each of a plurality of units of audio/visual equipment includes a microcomputer for controlling operation of the audio/visual equipment. The microcomputers of the audio/visual equipment are connected to each other by way of a bus system. One unit of the audio/visual equipment is set as an audio/visual center equipment. The audio/visual center equipment controls the entire system in a concentrated manner. The audio/visual center equipment receives remote control signals in a concentrated manner without causing remote controller receiver sections of the audio/visual equipment other than the audio/visual center equipment to function and transfers necessary commands to the other audio/visual equipment.

12 Claims, 9 Drawing Sheets

REMOTE CONTROLLING METHOD AND SYSTEM FEATURE STARTING METHOD AND CONTROLLING METHOD FOR AUDIO/VISUAL SYSTEM

BACKGROUND OF THE INVENTION

1. Field of the Invention

This invention relates to a remote control method for an audio/visual system wherein a plurality of units of audio/visual equipment are connected to each other by way of a domestic digital bus system such as, for example, a D2B bus system and also to a system feature starting method and a controlling method for an audio/visual system of the type mentioned. The system feature herein denotes a feature whose operation is performed by cooperation of a plurality of audio/visual units.

2. Description of the Related Art

Audio/visual systems wherein a plurality of units of audio/visual equipment are connected to each other by way of a bus system to make up a set are conventionally known. In an audio/visual system of the type mentioned, a center equipment is set in advance, and one concentrated remote control signal transmission means called system remote controller is provided for a system feature which is executed by cooperation of a plurality of units of equipment. A command from the system remote control signal transmission means is received by the center equipment and the system feature is started, and then, execution of the system feature is controlled by the center equipment. Then, the command or a corresponding command is transferred to the audio/visual equipment.

Figure 8:
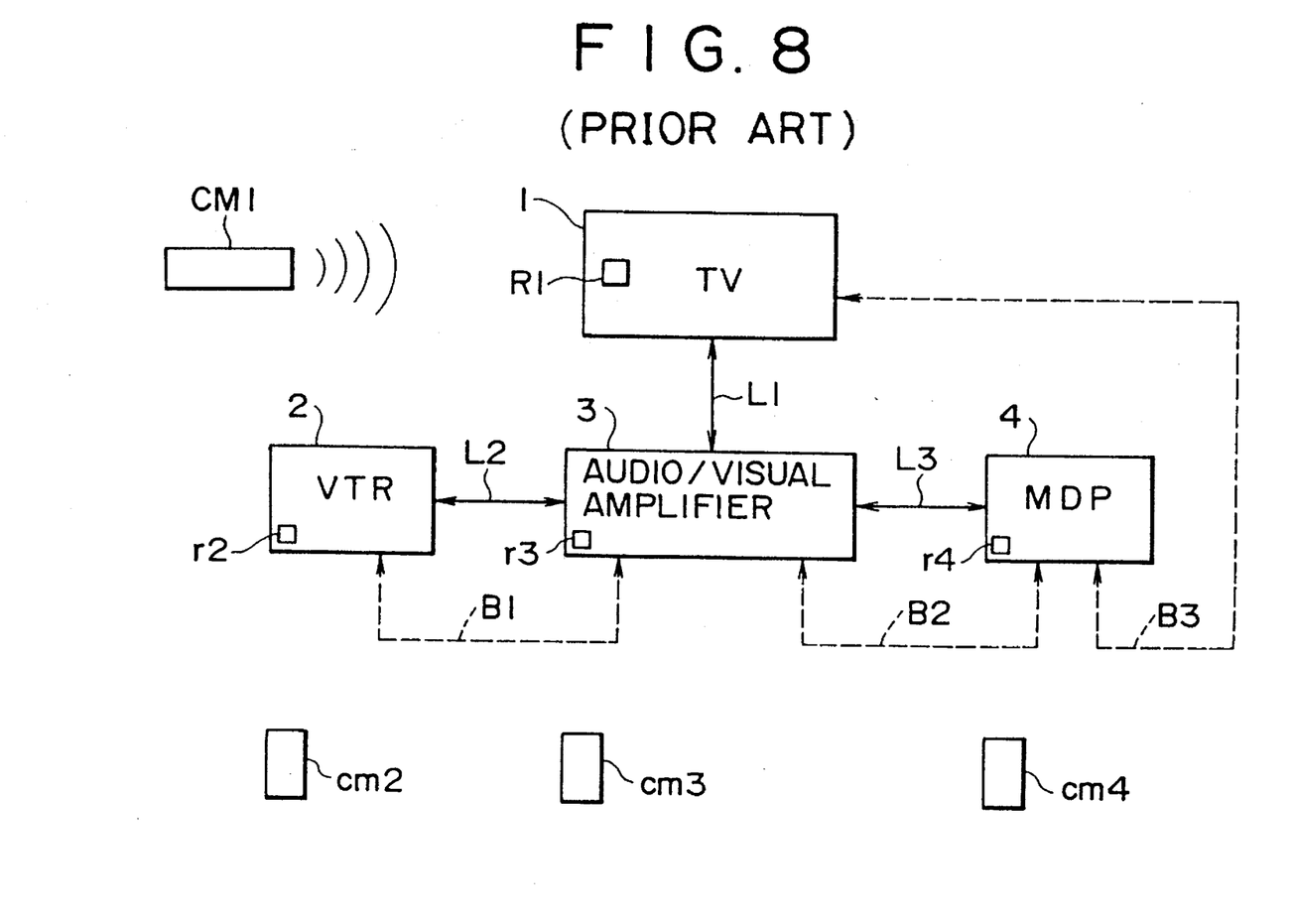
FIG. 8 is a block diagram showing a conventional audio/visual system.

An exemplary one of the conventional audio/visual systems of the type mentioned is shown in FIG. 8. Referring to FIG. 8, the audio/visual system includes a television receiver 1, a video tape recorder 2, an audio/visual amplifier 3, and a multi-disk player 4 which can reproduce optical disks such as a CD (compact disk) and an LD (laser disk). In the audio/visual system shown, the television receiver 1 serves as a center equipment.

For transmission and reception of an audio signal and a video signal, the television receiver 1 and the audio/visual amplifier 3 are connected to each other by way of an audio/visual signal line L1, and the audio/visual amplifier 3 and the video tape recorder 2, and the audio/visual amplifier 3 and the multi-disk player 4 are connected to each other by way of audio/visual signal lines L2 and L3, respectively.

Further, each of the units of audio/visual equipment 1 to 4 includes a control circuit in which a single or a plurality of microcomputers for controlling operation of the equipment are employed, and the control circuits of the audio/visual equipments 1 to 4 are connected in cascade connection by way of bidirectional buses B1, B2 and B3 for transmission of a control signal into a single system.

The audio/visual equipment 1 to 4 include remote controller receiver sections R1, r2, r3 and r4, respectively, and a remote control signal (command) received by each of them is input to and processed by a control circuit of the audio/visual equipment. In the audio/visual system shown, the remote controller receiver section R1 of the television receiver 1 is used only for reception of a signal from system remote control signal transmission means CM1. A command to execute a system feature which is performed by cooperation of a plurality of units of audio/visual equipment is transmitted from the system remote control signal transmission means CM1 to the remote controller receiver section R1 of the television receiver 1. The television receiver 1 converts the command received from the system remote control signal transmission means CM1 into a bus command (a command to be transmitted to each unit of audio/visual equipment by way of the bus system) and sends out the bus command to the audio/visual equipment by way of the buses B1 to B3.

Each unit of audio/visual equipment transfers the bus command to a next unit of audio/visual equipment and determines whether or not the address included in the bus command is an address representative of the unit of audio/visual equipment itself, and then, if the address is the address of itself, the bus command is fetched and decoded so that an operation corresponding to the command is executed.

In the audio/visual system of FIG. 8, commands from the different system remote control signal transmission means are all received by the television receiver and a bus command is delivered to the equipment, but the television receiver includes the receiver section only and does not function as a system controller which controls the entire system. It is to be noted that the system remote control signal transmission means CM1 also generates a command of a feature whose operation completes itself only with the television receiver 1.

Further, in the audio/visual system of FIG. 8, remote control signal transmission means cm2, cm3 and cm4 for exclusive use are prepared for the individual audio/visual equipment 2 to 4, respectively, and each unit of the equipment 2 to 4 itself can uniquely receive also a command from the remote control signal transmission means cm2, cm3 or cm4 for exclusive use therewith.

Figure 9:
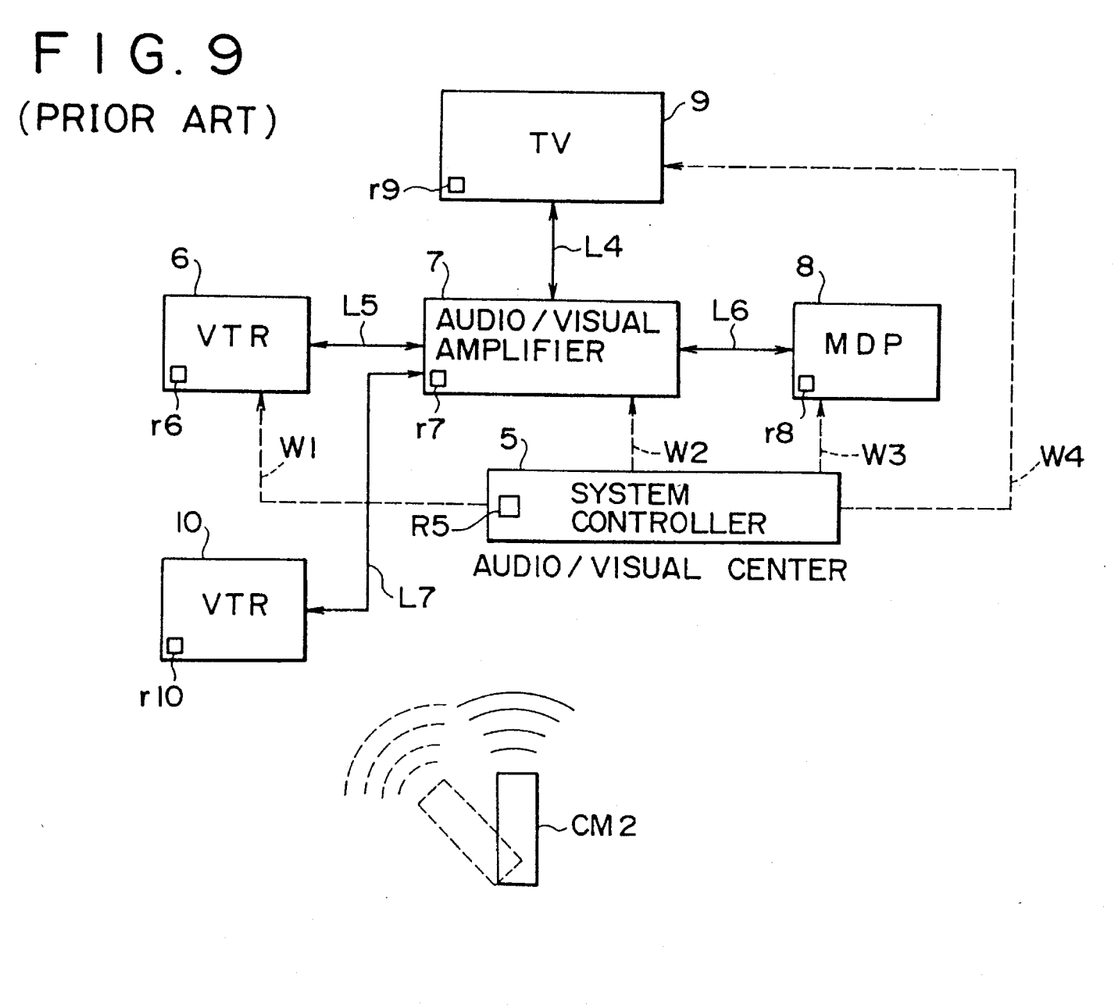
FIG. 9 is a block diagram of another conventional audio/visual system.

FIG. 9 shows another exemplary one of the conventional audio/visual systems of the type described above. The audio/visual system is constructed such that audio/visual equipment other than a center equipment are connected in a star connection around the center equipment so that one directional communication is performed from the center equipment. In particular, in the audio/visual system, a system controller 5 is provided as a center equipment, and a video tape recorder 6, an audio/visual amplifier 7, a multi-disk player 8 and a television receiver 9 are connected to the system controller 5 by way of one-directional communication control lines W1, W2, W3 and W4 so that they are controlled one-directionally by the system controller 5.

The audio/visual amplifier 7 and the television receiver 9 are connected to each other by way of an audio/visual signal line L4, and the audio/visual amplifier 7 and the video tape recorder 6, and the audio/visual amplifier 7 and the multi-disk player 8 are connected to each other by way of audio/visual signal lines L5 and L6, respectively. The audio/visual system further includes an extended second video tape recorder 10, which is not compatible with the one-directional communication of the audio/visual system.

System remote control signal transmission means CM2 is provided for a receiver section R5 of the system controller 5, and a command of a system feature is transmitted from the system remote controller CM2 to the system controller 5. When the command of the system feature is received, the system controller 5 transmits a control command to the equipment 6 to 9 by way of control lines W1 to W4 to realize the object system feature.

Also in the present audio/visual system, the audio/visual equipment 6 to 9 and the extended equipment 10 can receive, at respective receiver sections r6 to r9 and r10 thereof, commands from remote control signal transmission means cm6 to cm9 and cm10 for exclusive use therewith, respectively, and execute features they individually have.

In the audio/visual system, audio/visual equipment to be newly extended are limited by the number of plugs or jacks of the system controller 5 serving as center equipment or the number of selection keys for categories (for example, a video tape recorder or a multi-disk player) of system remote control signal transmission means. When an audio/visual equipment to be extended is a product of a different company, any of a very limited number of commands of the system remote control signal transmission means is converted in the inside of the system controller 5 serving as a center equipment and transmitted to the audio/visual equipment or else a code of the different company is transmitted directly to the equipment from the system remote control signal transmission means.

With the conventional audio/visual systems described above, however, no protection means for a system feature during execution of the system feature is involved, and even if the system feature has been started with the center equipment set as a master and is being executed, if a command from the remote control signal transmission means for exclusive use with any of the units of equipment is received, then the audio/visual system operates unconditionally in response to the command.

For example, when the multi-disk player 4 or 8 receives a stop command from the remote control signal transmission means cm4 or cm8 for exclusive use therewith while dubbing wherein a reproduction signal of the multi-disk player 4 or 8 is being recorded the multi-disk player 4 or 8 enters into a stop mode although it is performing dubbing. Therefore, there is the possibility that the video tape recorder 2 or 4 may maintain its recording condition without knowing that the multi-disk player 4 or 8 has stopped.

Also with the conventional systems, when each of the unit of audio/visual equipment recognizes a system feature being executed thereby or when any units of the audio/visual equipment delivers an inquiry for a feature being executed to the center equipment, the feature being executed can be recognized and protection for the feature can be performed. In this instance, however, there is a problem in that a large memory capacity is required for each audio/visual equipment or confusion of communication on the bus results. Further, where a warning indication such as, for example, "during execution of dubbing at present" is provided for protection, such indication must be performed on each of the audio/visual equipments. Consequently, each of the units of equipment is complicated in construction.

Further, the conventional audio/visual system of FIG. 9 has a drawback in that it is difficult for a user to recognize or operate the system in that the controlling method for an extended equipment is unclear or the matching method is varied depending upon the manufacturer.

Further, in the conventional audio/visual systems, when infrared rays are used for a remote controller signal, the remote control signal transmission means for exclusive use with each of the equipments must necessarily emit a remote controller signal toward the corresponding audio/visual equipment, but since a plurality of remote control signal transmission means are present and because the positions of the remote controller receiver sections are generally different among the individual units of audio/visual equipment, there is the possibility that confusion by which remote control signal transmission means and to which direction a remote controller signal should be emitted may result.

On the other hand, in the conventional audio/visual systems, when a command is to be transmitted from the system remote control signal transmission means to the center equipment to perform a system feature, the user will perform also an operation to select audio/visual equipment, with which the system feature is to be executed, by way of a selection key (switch) of the system remote control signal transmission means.

A further audio/visual system is also known wherein a system feature is started in response to a trigger signal other than an operation of such system remote control signal transmission means. In particular, the audio/visual system is constructed such that a variation when a power source switch of each equipment is operated to make the power source available is detected by the audio/visual center equipment and, in response to such detection, the audio/visual center equipment automatically performs switching of a source. Where the audio/visual equipment is, for example, a CD player, when the power source to it is turned on, the audio/visual center equipment detects the variation and connects the reproduction output of the CD player to a loudspeaker by way of an audio/visual amplifier to effect switching of the source.

In the conventional audio/visual system described above, an equipment with which a system feature is to be performed must be selected by means of the system remote control signal transmission means. Meanwhile, in recent audio/visual systems, a plurality of video tape recorders, disk reproduction apparatus and so forth can be connected. Therefore, each of the systems remote controllers includes a plurality of selection keys provided for the category such as a video tape recorder, and one of the units of audio/visual equipment must be specified by selection using a plurality of selection keys provided for each category. Consequently, operations are complicated, and the user is puzzled frequently in operation.

Further, with the conventional audio/visual system, while only one unit of equipment to serve as a source can be determined from within a plurality of units of equipment, such a complicated operation as to alternately switch two sources is not available.

Further, the conventional audio/visual system is further disadvantageous in that the range of application of a system feature is so small that, even if it is tried to add a new system feature to an audio/visual equipment to be incorporated newly into the audio/visual system, since the audio/visual center equipment controls all system features, such addition cannot be realized unless the audio/visual system recognizes the new system feature in advance.

SUMMARY OF THE INVENTION

It is an object of the present invention to provide a remote controlling method for an audio/visual system which can protect a system feature being executed.

It is another object of the present invention to provide a remote controlling method for an audio/visual system which is easy to use.

It is a further object of the present invention to provide a system feature starting method and controlling method for an audio/visual system which simplifies a starting operation of a system feature whose operation is executed by cooperation of a plurality of units of audio/visual equipment.

In order to attain the objects described above, according to an aspect of the present invention, there is provided a remote control method for an electronic equipment system which includes a plurality of units of electronic equipment each including a microcomputer for controlling operation of the electronic equipment, the microcomputers of the electronic equipment being connected to each other by way of a bus system, wherein an electronic center equipment provided additionally in the electronic center apparatus controls the electronic equipment system in a concentrated manner, and the electronic center equipment receives remote control signals in a concentrated manner without causing remote control signal reception sections of the electronic equipment other than the electronic center equipment to function and transfers required commands to the electronic equipment.

With the remote control method, since the electronic center equipment effects concentrated control of the entire electronic system and receives remote control signals in a concentrated manner without causing the remote control sections of the electronic equipment other than the electronic center equipment to function, even if a remote control command to any one of the units of electronic equipment which is executing a system feature is generated, the electronic equipment does not receive the command from the remote control signal transmission means for exclusive use therewith, and accordingly, protection during execution of the system feature is realized.

Further, even where infrared rays having a high directivity are used as remote control signal transmission means or whichever one of the remote control signal transmission means for exclusive use with the electronic equipment is used, only it is required to transmit a remote control signal toward the audio/visual center equipment. Consequently, otherwise possible confusion in selection of a type of equipment for an object of transmission or a transmission direction can be reduced.

Furthermore, since remote control signals are received in a concentrated manner by the electronic center equipment, also a remote control signal of electronic equipment manufactured by a different company can be converted readily into a bus command by the electronic center equipment. Where a command for a standard feature is made common among different manufacturers, the user can perform a remote controlling operation readily for extended equipment.

Preferably, upon initialization when each unit of the electronic equipment is connected by way of the bus system, the electronic center equipment sets so as to inhibit functioning of the remote control signal reception section of the electronic equipment.

Preferably, a command peculiar to each unit of the electronic equipment from remote control signal transmission means provided for exclusive use with the electronic equipment is received and decoded by the electronic center equipment and transferred to a relevant one or ones of the electronic equipment when necessary.

Each unit of the electronic equipment may output a video signal or an audio signal.

One of the units of electronic equipment may be a tape recording and/or reproduction apparatus or a disk recording and/or reproduction apparatus.

The electronic equipment may include a disk apparatus which transfers a signal and a tape apparatus which records the signal from the disk apparatus.

Preferably, a command peculiar to each unit of the electronic equipment from remote control signal transmission means provided for exclusive use with the electronic equipment is received and decoded by the electronic center equipment, and when the remote control signal transmission means of a relevant one or ones of the electronic equipment are executing another feature, the electronic center equipment develops a warning representing the fact. Thus, upon protection of a system feature, a warning can be developed from the electronic center equipment.

According to another aspect of the present invention, the remote control method can be realized on a remote commander apparatus for controlling an electronic equipment system which includes a plurality of units of electronic equipment each including a microcomputer for controlling operation of the electronic equipment, the microcomputers of the electronic equipment being connected to each other by way of a bus system, comprising an electronic center equipment for controlling the electronic equipment system in a concentrated manner, the electronic center equipment being constructed to receive remote control signals in a concentrated manner without causing remote control signal reception sections of the electronic equipment other than the electronic center equipment to function and transfer required commands to the electronic equipment.

According to a further aspect of the present invention, there is provided electronic equipment which is included in and controlled by an electronic equipment system which includes, in addition to the electronic equipment, one or a plurality of second units of electronic equipment and electronic center equipment for controlling the electronic equipment system in a concentrated manner, each unit of the electronic equipment, the second unit of electronic equipment and the electronic center equipment including a microcomputer for controlling operation of the electronic equipment, the microcomputers of the electronic equipment being connected to each other by way of a bus system, wherein remote control signal reception sections of the electronic equipment and the second unit of electronic equipment are rendered inoperative while only the electronic center equipment is operative to receive remote control signals in a concentrated manner and transfer a required command to the electronic equipment and the second unit of electronic equipment.

According to a still further aspect of the present invention, there is provided a system feature starting method for an audio/visual system which includes a plurality of units of audio/visual equipment each including a control circuit for controlling operation of the audio/visual equipment, the control circuits of the audio/visual equipment being connected to each other by way of a bus system, the audio/visual system further including an audio/visual center equipment for controlling the audio/visual system in a concentrated manner, at least one unit of the audio/visual equipment including manually operable inputting means for a system feature by which the audio/visual equipment operates in cooperation with any one of the other audio/visual equipment, wherein the system feature is started when the manually operable inputting means is manually operated.

With the system feature starting method, a system feature is started by direct inputting to any one unit of audio/visual equipment other than the audio/visual center equipment such as by operation of a system feature key of an operation panel of the audio/visual equipment. Since a trigger for starting the system feature is provided directly to the equipment which takes part in the system feature, this means that the audio/visual equipment has been selected already. Consequently, otherwise possible confusion in selective operation of an audio/visual equipment is reduced.

According to a yet further aspect of the present invention, there is provided a system feature controlling method for an audio/visual system which includes a plurality of audio/visual equipment each including a control circuit for controlling operation of the audio/visual equipment, the control circuits of the audio/visual equipment being connected to each other by way of a bus system, the audio/visual system further including an audio/visual center equipment for controlling the audio/visual system in a concentrated manner, at least one unit of the audio/visual equipment including manually operable inputting means for a system feature by which the audio/visual equipment operates in cooperation with any one unit of the other audio/visual equipment, wherein the system feature is started when the manually operable inputting means is manually operated, and the one audio/visual equipment itself controls the system feature.

With the system feature controlling method, since not the audio/visual center equipment but each unit of audio/visual equipment controls a system feature of the audio/visual equipment, it is easy to add a new feature to the audio/visual system, and the expandability of the system is enhanced.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 1:
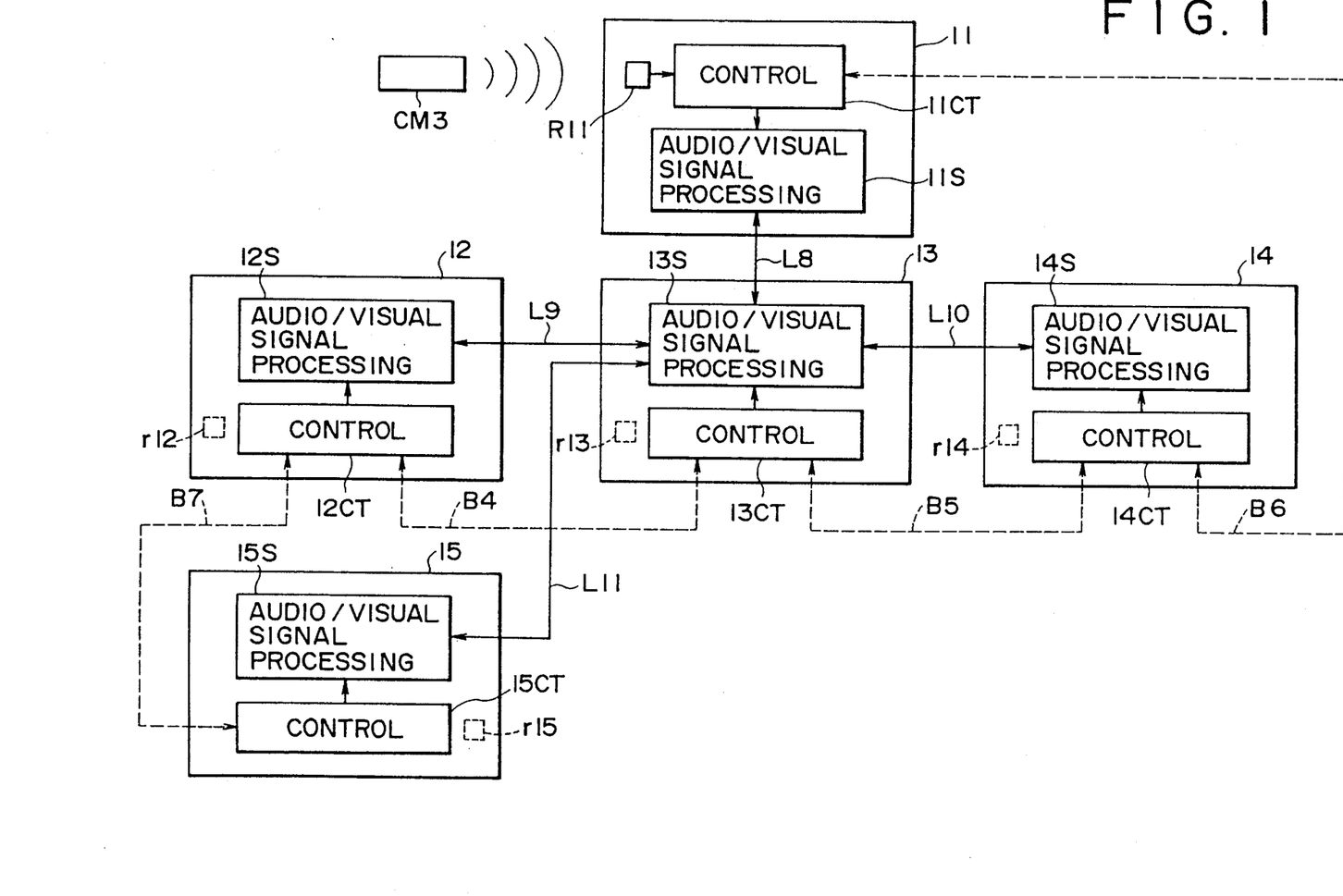
FIG. 1 is a block diagram of an audio/visual system to which a remote control method according to the present invention is applied.

Referring first to FIG. 1, there is shown an audio/visual system to which a remote control method of the present invention is applied. The audio/visual system shown includes a television receiver 11 serving as an audio/visual center equipment in the present audio/visual system. The television receiver 11 includes a receiver section R11 for receiving a remote control signal from system remote control signal transmission means CM3.

The audio/visual system further includes a first video tape recorder 12, an audio/visual amplifier 13, and a multi-disk player 14. The audio/visual system further includes a second video tape recorder 15 which is connected later as an extended unit of equipment.

For transmission and reception of an audio signal and a video signal, an audio/visual signal processing circuit 11S of the television receiver 11 and an audio/visual signal processing circuit 13S of the audio/visual amplifier 13, the audio/visual signal processing circuit 13S of the audio/visual amplifier 13 and an audio/visual signal processing circuit 12S of the first video tape recorder 12, the audio/visual signal processing circuit 13S of the audio/visual amplifier 13 and an audio/visual signal processing circuit 14S of the multi-disk player 14, and the audio/visual signal processing circuit 13S of the audio/visual amplifier 13 and an audio/visual signal processing circuit 15S of the second video tape recorder 15 are connected to each other by way of audio/visual signal lines L8, L9, L10 and L11, respectively.

The audio/visual equipment 11 to 15 include control circuits 11CT to 15CT, respectively, each of which employs a single or a plurality of microcomputers for controlling operation of the equipment. The control circuits 11CT to 15CT of the audio/visual equipment 11 to 15 are connected in cascade connection by way of bidirectional buses B4 to B7 for transmission of a control signal to make up a system and are controlled in a concentrated condition by the television receiver 11 which serves as an audio/visual center equipment.

In this instance, operation of the system is controlled by the television receiver 1 serving as an audio/visual center equipment, and the television receiver 11 receives remote control signals in a concentrated manner without causing remote controller receiver sections r12 to r15 of the equipments 12 to 15 except the audio/visual center equipment to function in principle. Also commands peculiar to the equipment 12 to 15 from the remote control signal transmission means for exclusive use with the audio/visual equipment are received by the television receiver 11 serving as an audio/visual center equipment and transmitted to the individual equipment.

In order to prevent the remote controller receiver sections r12 to r15 of the equipment 12 to 15 other than the audio/visual center equipment 11 from functioning, upon initialization of connection of the bus system of the present audio/visual system, the audio/visual center equipment 11 sends a command to the equipment other than the audio/visual center equipment 11 itself so that the remote controller receiver sections of them may not be caused to function.

Further, for an extended unit of equipment, protection can be achieved by constructing the system such that, when the extended equipment is connected to the bus system, the connection is detected mechanically or electrically by the audio/visual system and the remote controller receiver section of the extended equipment is set automatically so that it may not function. Or, the system may alternatively be constructed such that, when the extended equipment is connected to the bus system, it is transmitted to the audio/visual center equipment that the extended equipment has been connected, and then the audio/visual center equipment sends a command to the extended device so that the remote controller receiver section of the extended equipment may not function.

Figure 2:
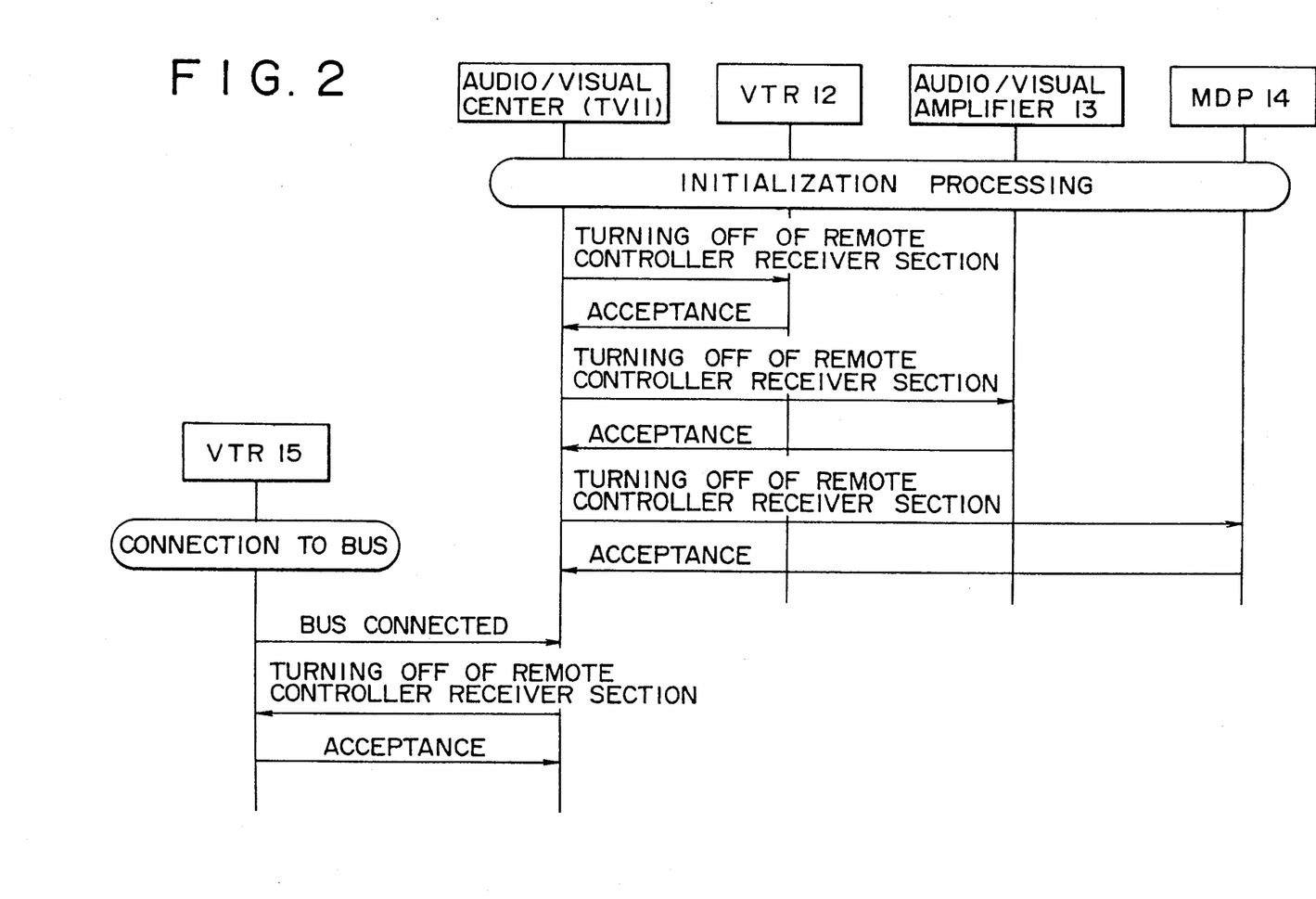
FIG. 2 is a diagrammatic view illustrating a sequence of operations of a process of preventing remote controller receiver sections of equipment of the audio/visual system of FIG. 1 other than an audio/visual center equipment from functioning.

FIG. 2 illustrates a sequence of operations of a method of preventing the remote controller receiver sections of the equipment 12 to 15 other than the audio/visual center equipment 11 from functioning.

In particular, referring to FIG. 2, after initialization processing is performed when the audio/visual system is built up and connected by way of the bus system, a command to turn off the remote controller receiver section r12 is sent from the audio/visual center equipment, that is, television receiver 11, to the first unit audio/visual equipment, for example, the first video tape recorder 12. Then, the first vide tape recorder 12 stops the supply of power, for example, to the remote controller receiver section r12 to put the remote controller receiver section r12 into a rest condition and sends back a command of acceptance of turning off of the remote control function to the audio/visual center equipment 11.

The operations described above are performed successively for the audio/visual amplifier 13 and the multi-disk player 14 to put the remote controller receiver sections r13 and r14 into a rest condition.

If the second video tape recorder 15 is connected as an extended equipment to the audio/visual system, a command representing that a video tape recorder has been connected to the bus system is sent from the second video tape recorder 15 to the audio/visual center equipment 11 by way of the bus system. Then, a command to turn off the remote controller receiver section r15 of the second video tape recorder 15 is sent from the audio/visual center equipment 11 to the second video tape recorder 15. The second video tape recorder 15 interrupts, upon reception of the command, the supply of power, for example, to the remote controller receiver section r15 similarly as described above so that the remote controller receiver section r15 may not function, and then sends back a command of acceptance of turning off of the remote control function to the audio/visual center equipment 11.

It is to be noted that, in this instance, when the extended equipment is a unit of audio/visual equipment of a different manufacturer, the audio/visual center equipment may leave the remote controller receiver section of the equipment operative.

In this instance, a command is sometimes delivered only to the extended equipment during execution of a system feature from the remote control signal transmission means for exclusive use with the extended equipment. The audio/visual center equipment 11 detects a variation of the condition of the extended equipment and stops, if it cannot be avoided to interrupt the feature being executed, all of the other cooperating equipment by which the feature is being executed. Then, an explanation of the interruption may be indicated in an overlapping relationship with an image, for example, on the screen of the television receiver 11.

In this instance, as means of the audio/visual center equipment 11 for detecting a variation of the condition of any other audio/visual equipment, at a point of time when the condition of each unit of the equipment varies, status information of the equipment which is automatically developed from the equipment for delivering a notification of the fact to the audio/visual center equipment 11 can be used. Another method wherein, when the remote controller receiver section R11 of the audio/visual center equipment 11 receives a command which is impossible to analyze, the audio/visual center equipment 11 may deliver an inquiry for the condition to all of the equipment to be employed alternatively.

In this manner, an operation of the system is controlled by the audio/visual center equipment 11, and the audio/visual center equipment 11 receives remote control signals in a concentrated manner without causing the remote controller receiver sections r12 to r15 of the equipment 12 to 15 other than the audio/visual center equipment to function in principle. Consequently, it can be prevented that a unit which is executing a system feature receives and operates in accordance with a command from the remote control transmission means for exclusive use with the equipment. In other words, protection of the system feature can be realized. Thereupon, processing for indication of a warning or the like can be performed readily by the audio/visual center equipment 11.

Figure 3:
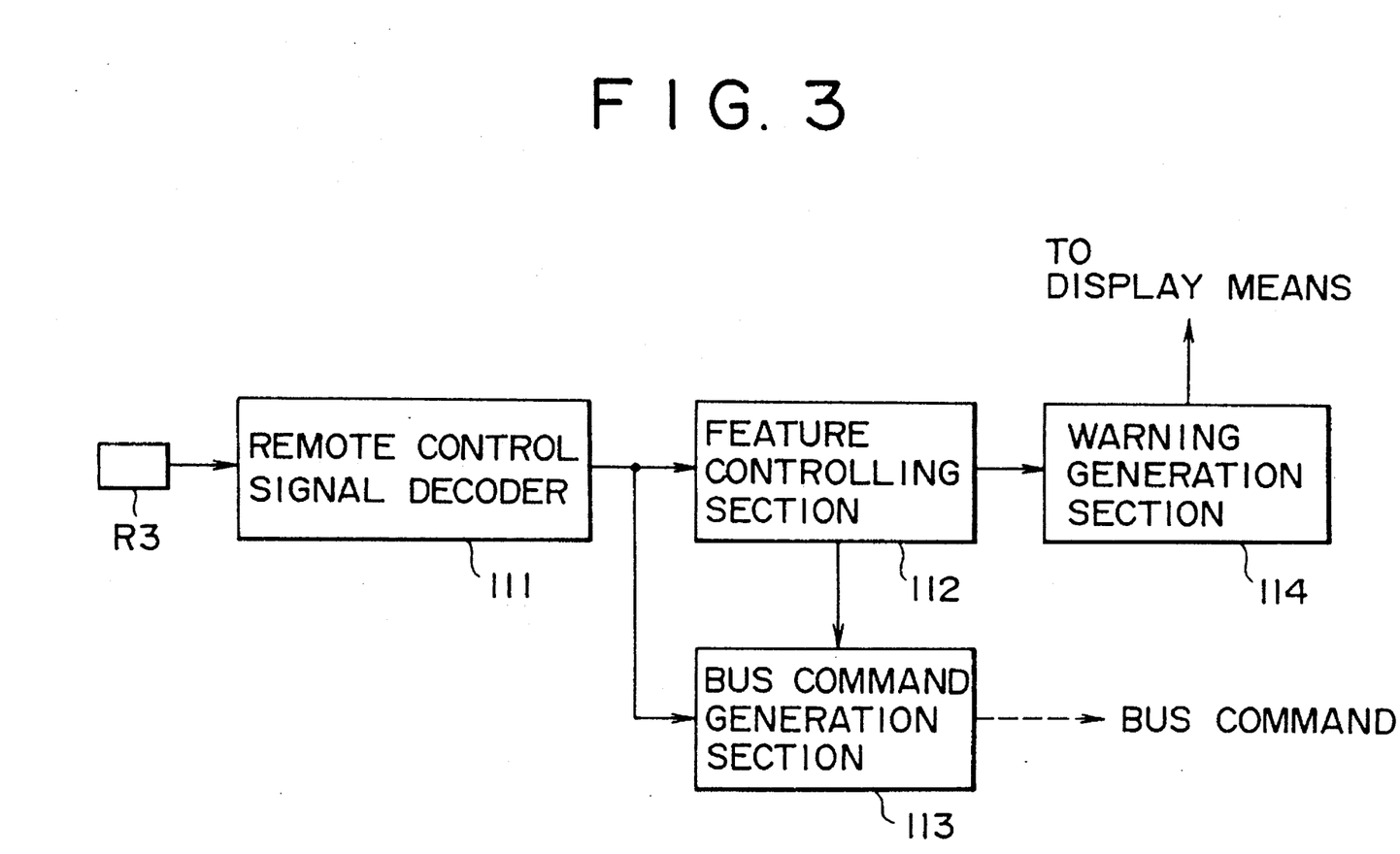
FIG. 3 is a block diagram illustrating a remote control signal reception operation and system control of the audio/visual center equipment of the audio/visual system of FIG. 1.

FIG. 3 illustrates remote control signal processing of the control circuit 11CT of the television receiver 11 serving as an audio/visual center equipment.

Referring to FIG. 3, a remote control command from the system remote control signal transmission means CM3 received at the remote controller receiver section R11 is decoded by a decoding section or remote control signal decoder 111 and supplied to a feature controlling section 112 and a bus command generation section 113.

The feature controlling section 112 recognizes whether the remote control command thus received originates from the system remote control signal transmission means CM3 or the remote control signal transmission means for exclusive use with any of the equipment, and when it recognizes that the remote control command represents a system feature, bus commands to realize the feature is sent to audio/visual equipment which should cooperate to realize the feature. Thereupon, addresses of the individual units of audio/visual equipment are added to the respective bus commands.

On the other hand, when the feature controlling section 112 recognizes that the received remote control command is not a command from the system remote control signal transmission means CM3, it subsequently recognizes from which one of the equipment the remote control command is received, adds the address of the equipment to produce a corresponding bus command and sends the bus command to the equipment. It is to be noted that a command from the remote control signal transmission means for exclusive use with each unit of the equipment includes an address of the equipment. Accordingly, the audio/visual center equipment 11 may alternatively send the received command by broadcast communication to all of the equipment (transmission transfer).

The feature controlling section 112 has a memory in which information is stored so that what feature is being executed at present by each unit of the equipment or what system feature is being executed at present may always be recognized. Thus, if, when a system feature is being executed and is not completed as yet, a command input from the remote control signal transmission means for exclusive use with one of those units of equipment which is engaged in execution of the system feature is received by the audio/visual center equipment 11, then the feature controlling section 112 can develop a warning that the system feature is being executed and ignore the command or call for an attention of the user.

In particular, when the feature controlling section 113 recognizes that a received remote control command originates from a unit of equipment which is executing a system feature, it activates a warning generation section 114 so that it is displayed in an overlapping condition, for example, on the screen of the television receiver 11 that the system feature is being executed. Looking at the warning display, the user can determine whether the system feature should be continued or interrupted intentionally.

Figure 4:
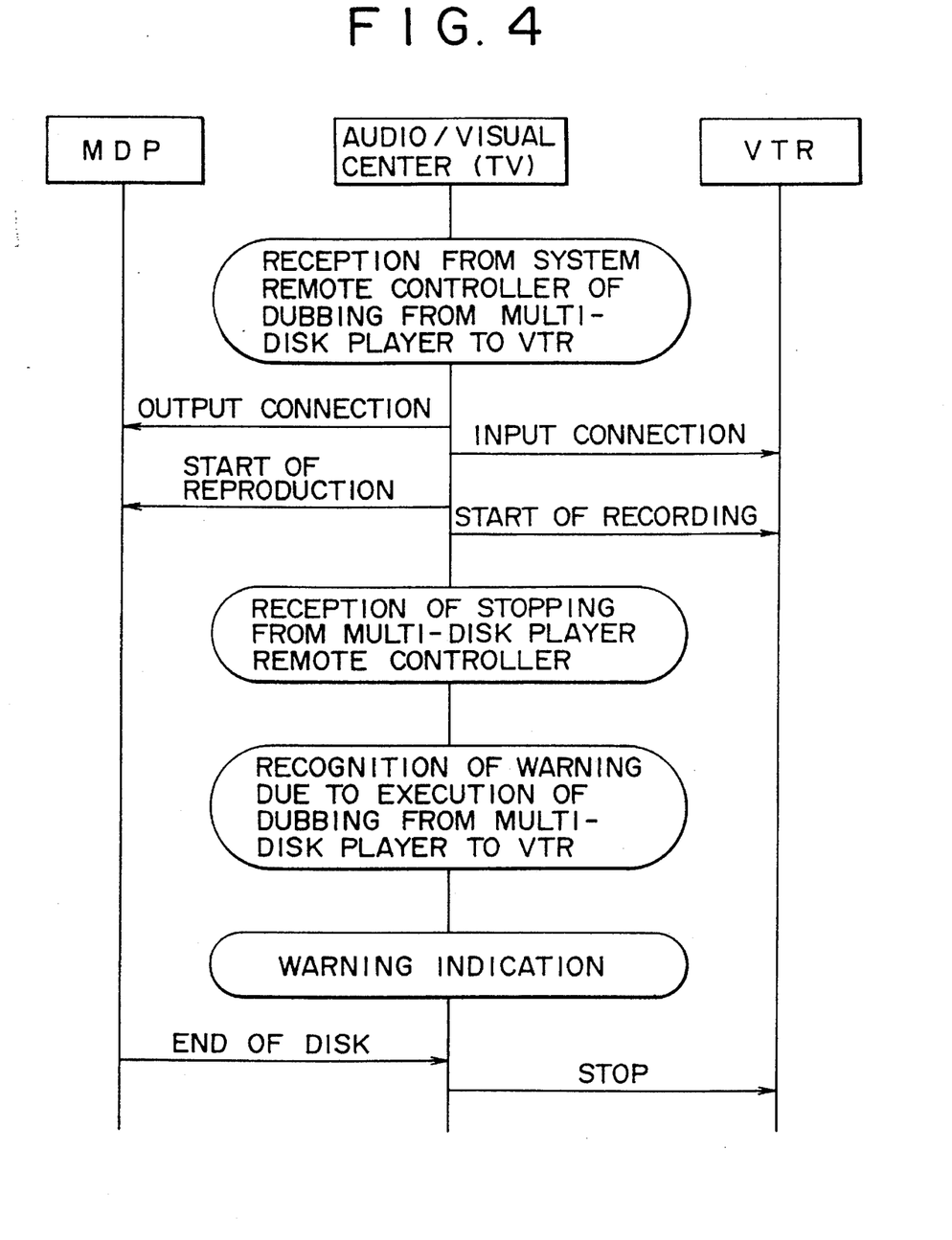
FIG. 4 is a diagrammatic view illustrating a process of executing protection of the audio/visual system of FIG. 1.

FIG. 4 illustrates a sequence of operations for protection of a system feature. In FIG. 4, an ellipse denotes an event, and an arrow mark denotes transmission of a command.

Referring to FIG. 4, the system remote control signal transmission means CM3 transmits to the audio/visual center equipment 11 a command to perform dubbing wherein a reproduction signal of the multi-disk player 14 is recorded by means of the first video tape recorder 12. Upon reception of the remote control command, the audio/visual center equipment 11 sends a bus command to the multi-disk player 14 to connect an output terminal of it to the audio/visual amplifier 13, that is, to send a reproduction output signal to the audio/visual amplifier 13, and sends another bus command to the first video tape recorder 12 to connect an audio/visual input terminal of it to the audio/visual amplifier 13. Thereafter, the television receiver 11 serving as an audio/visual center equipment sends a bus command to the multi-disk player 14 to start reproduction and sends another bus command to the first video tape recorder 12 to put itself into a recording mode. By the operations described so far, a system feature of dubbing from the multi-disk player 14 to the first video tape recorder 12 by way of the audio/visual amplifier 13 is executed.

It is assumed that, during execution of the system feature, a stopping command from the remote control signal transmission means for exclusive use with the multi-disk player 14 is received by the audio/visual center equipment 11. Since the television receiver 11 serving as an audio/visual center equipment recognizes that dubbing is being executed, it determines that a warning indication should be provided on the screen thereof. Consequently, a warning indication that dubbing is being executed is provided in an overlapping relationship with a reproduction image on the screen of the television receiver 11. If, for example, the user does not input a stopping command, dubbing is continued.

Then, when reproduction of the disk on the multi-disk player 14 comes to an end, a status signal representing this is automatically transmitted to the audio/visual center equipment 11 by way of the bus system. Upon reception of the status signal, the audio/visual center equipment 11 sends a stopping bus command to the first video tape recorder 12. Consequently, dubbing comes to an end.

In this manner, even if, during execution of a system feature, a remote control command to an audio/visual equipment by which the feature is being executed is received, the audio/visual center equipment can prevent operation of the audio/visual equipment, and consequently, protection of the system feature is realized.

It is to be noted that, while, in the embodiment described above, a warning indication that a system feature is being executed is provided on the television receiver, when it is tried to provide a warning indication otherwise on the audio/visual amplifier or some other audio/visual equipment, it should be provided on a display unit such as an LCD (liquid crystal display) unit. Further, the warning may not depend upon a display but may depend upon sound or may be provided by means of a warning lamp.

In the following, a system feature starting method and controlling method for an audio/visual system according to the present invention will be described.

Figure 5:
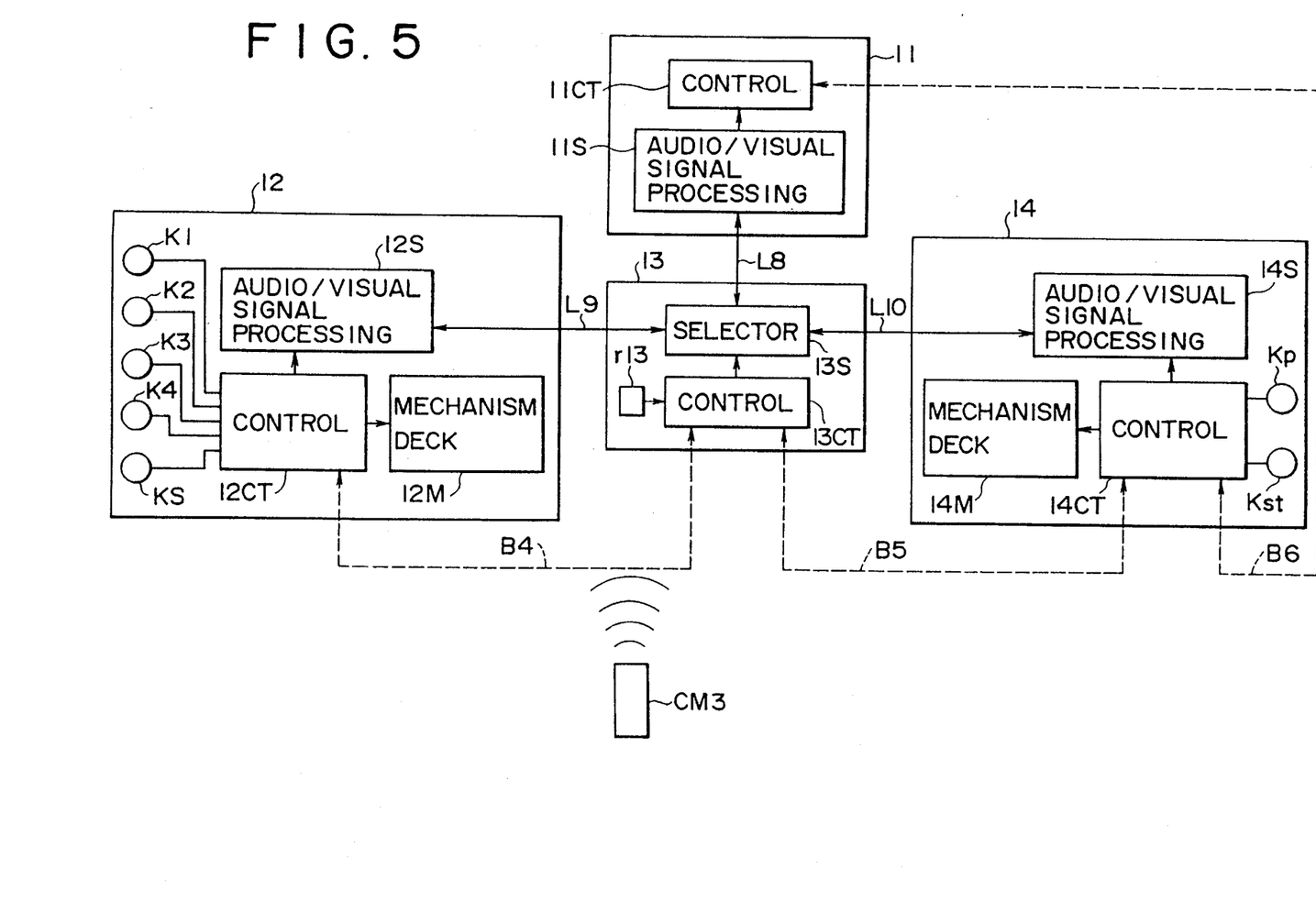
FIG. 5 is a block diagram of another audio/visual system to which a system feature starting method and controlling method according to the present invention are applied.

Referring to FIG. 5, there is shown an audio/visual system to which the system feature starting method and controlling method of the present invention are applied. The audio/visual system shown includes a television receiver 11, a video tape recorder 12, an audio/visual selector or amplifier 13, a multi-disk player 14 which can reproduce a plurality of types of optical disks such as a compact disk (CD) and a laser disk (LD), and a system remote control signal transmitter CM3.

The audio/visual selector 13 performs selective switching of an audio/visual signal and serves as an audio/visual center equipment. The audio/visual selector 13 includes a reception section r13 for receiving a remote controller command from the system remote control signal transmitter CM3.

For transmission and reception of an audio signal and a video signal, an audio/visual signal processing circuit 11S of the television receiver 11 and a selector circuit 13S of the audio/visual selector 13 are connected to each other by way of an audio/visual signal line L8. Further, the selector circuit 13S of the audio/visual selector 13 and an audio/visual signal processing circuit 12S of the video tape recorder 12, and the selector circuit 13S of the audio/visual selector 13 and an audio/visual signal processing circuit 14S of the multi-disk player 14 are connected to each other by way of audio/visual signal lines L9 and L10, respectively.

The audio/visual equipment 11, 12, 13 and 14 include control circuits 11CT, 12CT, 13CT and 14CT each employing one or a plurality of microcomputers for controlling operation of the equipment. The control circuits 11CT to 14CT of the audio/visual equipment 11 to 14 are connected to each other in cascade connection by way of bidirectional buses B4, B5 and B6 for transmission of a control signal so as to make up a system. Each of the audio/visual equipments 11 to 14 has an address on the system allocated thereto so that it can be identified on the system.

The control circuits 11CT, 12CT and 14CT of the audio/visual equipment 11, 12 and 14 control the audio/visual signal processing circuits 11S, 12S and 14S, respectively. Mechanism decks 12M and 14M are provided on the video tape recorder 12 and the multi-disk player 14, respectively, and the control circuits 12CT and 14CT also control the mechanism decks 12M and 14M.

The control circuit 13CT of the audio/visual selector 13 controls selective switching of the selector circuit 13S and further has another function of controlling the entire audio/visual system in a concentrated manner. The control circuit 13CT further controls system features. However, system features which can be controlled by the audio/visual selector 13 as an audio/visual center equipment are set in advance.

A command for executing a system feature which can be controlled by the audio/visual center equipment 3 is provided from the system remote control signal transmitter CM3 to the remote controller reception section R of the audio/visual selector 13. The audio/visual selector 13 converts the command received from the system controller transmitter CM3 into a bus command (a command to be transmitted to an audio/visual equipment by way of the bus system) obtained by adding an address of an equipment to the received command, and sends out the bus command to the control circuits of the audio/visual equipment by way of the buses B1 to B3.

Each of the control circuits 11CT to 14CT of the audio/visual equipment 11 to 14 transfers the bus command to a next unit of audio/visual equipment and determines whether or not the address included in the bus command is an address designating the audio/visual equipment itself, and if the address designates the audio/visual equipment itself, then the control circuit fetches and decodes the bus command and executes an operation corresponding to the command. Each of the control circuits 11CT to 14CT of the audio/visual equipment 11 to 14 notifies, when the status thereof changes, the audio/visual center equipment, which controls the system feature, of status information representative of the new status.

As described above, the audio/visual selector 13 serving as an audio/visual center equipment transmits a command for execution of a system feature to the equipment by way of the bus system, and the equipment transmits, each time the status thereof changes, status information to the audio/visual center equipment, whereby the system feature proceeds. It is to be noted that, instead of causing each equipment to send out status information so as to report its status, the audio/visual center equipment may ask each unit of equipment for its status.

Again, a system feature which can be controlled by the audio/visual center equipment must necessarily be available with the audio/visual center equipment. In particular, a program for execution of the system feature must be prepared in the control circuit of the audio/visual center equipment.

Not only does the starting of the system feature take place by transmitting a command from the system remote control signal transmitter CM3 to the audio/visual center equipment, but also the system feature can be started, in the present embodiment, by performing a direct input key operation for a feature key provided on an operation panel of each equipment other than the audio/visual center equipment. Further, assuming presence of a system feature which cannot be controlled by the audio/visual center equipment, each unit of the equipment is constructed so as to control a system feature unique to it.

In particular, in the system shown in FIG. 5, a play key Kp and a stop key Kst are provided on the multi-disk player 14 while a play key K1, a pause key K2, a recording key K3, a stop key K4 and some other keys (not shown) are provided on the video tape recorder 12.

Further, in the system shown in FIG. 5, the video tape recorder 12 uniquely has a system feature of synchronous dubbing which allows dubbing in a timed relationship with a high degree of accuracy with a source (in the system shown in FIG. 1, the multi-disk player 14) input to the audio/visual selector 13, and a synchronous dubbing key KS for starting the system feature of synchronous dubbing is provided on the video tape recorder 12.

The system feature of synchronous dubbing is not prepared for the audio/visual selector 13 which serves as the audio/visual center equipment. Meanwhile, the video tape recorder 12 includes a unique feature control section (not shown) in the control circuit 12CT so that the feature may be controlled by the feature control section. In other words, a program for synchronous dubbing is prepared in the microcomputer constituting the control circuit 12CT.

Figure 6:
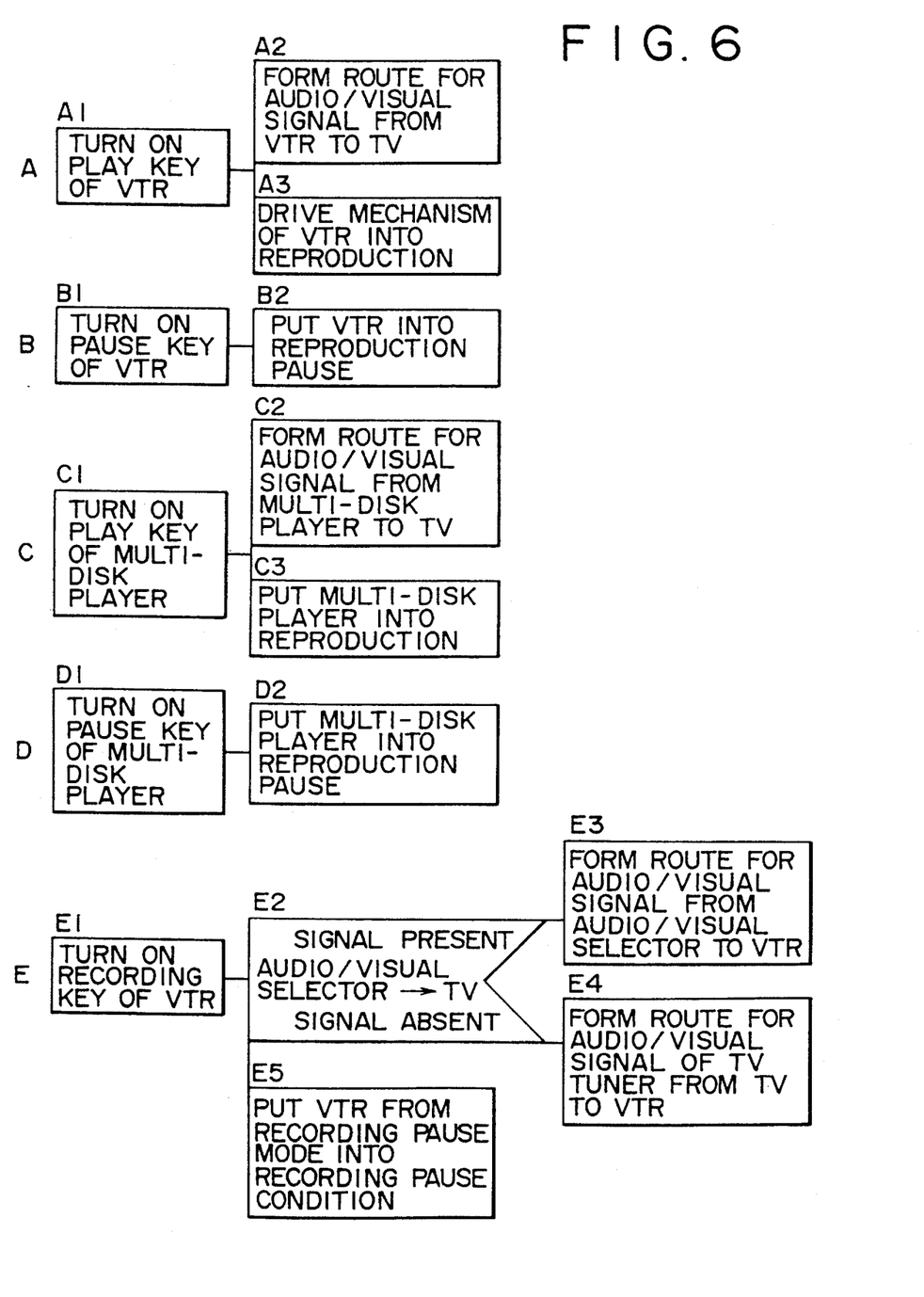
FIGS. 6 and 7 are diagrammatic views illustrating execution of a system feature on the audio/visual system shown in FIG. 5.
Figure 7:
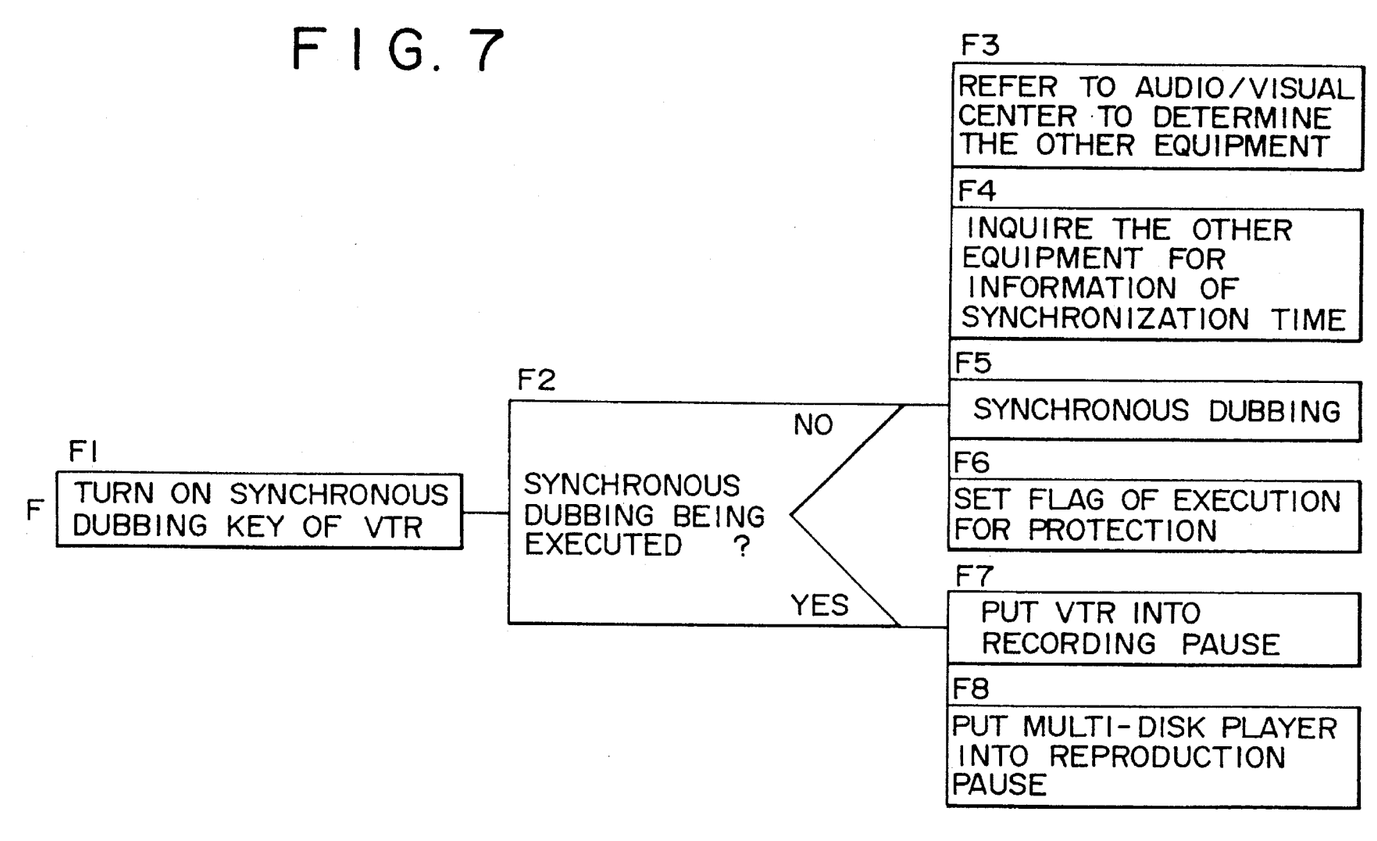

In the following, an example of execution of the synchronous dubbing feature to record a source signal from the multi-disk player 14 in a timed relationship with a high degree of accuracy by means of the video tape recorder 12 will be described with reference to diagrammatic views of FIGS. 6 and 7.

Entire Flow of Processing

A recording start point on the video tape recorder 12 side is determined by processes A and B, and a reproduction start point of the multi-disk player 14 on the reproduction side is determined by processes C and D, and then a recording stand-by condition is entered by a process E. Preparations for synchronous dubbing are completed with this. Subsequently, timed synchronous dubbing is started by a process F and is performed until an end process occurs.

Description of the Processes

Process A

First, when the play key K1 of the video tape recorder 12 is depressed at step A1, a command (status signal) representative of this is sent to the audio/visual selector 13 which serves as an audio/visual center equipment. The audio/visual selector 13 forms, at step A2, a route of an audio/visual signal from the video tape recorder 12 to the television receiver 11 by way of the audio/visual selector 13. Meanwhile, the video tape recorder 12 controls, at step A3, the mechanism deck 12M thereof to enter into a reproduction mode and renders a reproduction signal system of the audio/visual signal processing circuit 12S into a processing condition.

The process A is a system feature of so-called one-touch play wherein audio/visual signal connection is performed automatically in response to a reproduction instruction to the video tape recorder, and in the present system, the audio/visual center equipment can control the process A. While starting of the system feature of the process A can also be performed by way of the system remote control signal transmitter CM3, in the present system, it can be performed by operating the play key K1 of the video tape recorder 12 as described above.

It is to be noted that, where a remote controller for exclusive use is provided for the video tape recorder 12, the system feature can be started also in response to a reproduction instruction from the remote controller for exclusive use with the video tape recorder 12. Further, it is also possible to control the feature not by the audio/visual center equipment but by the video tape recorder 12 itself.

Process B

At step B1, while a reproduction screen on the television receiver 11 from the video tape recorder 12 is visually observed, the pause key K2 of the video tape recorder 12 is depressed at a position at which recording is desired to be started. In response to this, the mechanism deck 12M of the video tape recorder 12 enters a pause condition (temporary stopping condition) at step B2, and a recording start point (recording-in point) for synchronous dubbing is determined.

Process C

The process C is a system feature of one-touch play of the multi-disk player 14 and similar to the process of one-touch play of the video tape recorder 12 in the process A. In particular, when the play key Kp of the multi-disk player 14 is depressed at step C1, a command (status signal) representative of this is sent to the audio/visual selector 13 which serves as an audio/visual center equipment. The audio/visual selector 13 forms a route for an audio/visual signal from the multi-disk player 14 to the television receiver 11 by way of the audio/visual selector 13 at step C2. Meanwhile, the multi-disk player 14 drives, at step C3, the mechanism deck 14M into a reproduction condition.

While the starting of the system feature of the process C can be performed also from the system remote control signal transmitter CM3, in the present system, it can be performed by operating the play key Kp of the multi-disk player 14 as described hereinabove.

It is to be noted that, where there is a remote controller for exclusive use with the multi-disk player 14, the system feature can be started also in response to a reproduction instruction from the remote controller for exclusive use with the multi-disk player 14.

Process D

At step D1, while a reproduction screen on the television receiver 11 reproduced from the multi-disk player 14 is visually observed, the pause key K2 of the multi-disk player 14 is depressed at a position at which recording is desired to be started. The mechanism deck 14M of the multi-disk player 14 enters, at step D2, into a pause condition, and a reproduction start point (reproduction-in point) for synchronous dubbing is determined.

Process E

When the recording key K3 of the video tape recorder 12 is turned on at step E1, the audio/visual selector 13 serving as an audio/visual center equipment performs, at step E2, detection of a signal input to the television receiver 11. Then, if a signal input to the television receiver 11 is detected, then an audio/visual signal route is formed at step E3 so that the signal may be input to the video tape recorder 12.

If no signal is input to the television receiver 11, then since a built-in television tuner is specified as the source from which an image is displayed on the television receiver 11, an audio/visual signal route for inputting a signal of the television tuner to the video tape recorder 12 is formed at step E4.

Then at step E5, the mechanism deck 12M of the video tape recorder 12 is controlled and the recording system of the audio/visual signal processing circuit 12S is operated into a recording condition. It is to be noted that, since the recording key K3 is turned on in a condition wherein the video tape recorder 12 has been put into a pause condition, the video tape recorder 12 enters into a recording stand-by condition. Preparations for synchronous dubbing are completed with this.

In this manner, the process E is a system feature process wherein the source which is being enjoyed at present and is the television receiver 11 is changed over only by turning on the recording key K3 of the video tape recorder R2 so that it can be recorded with the video tape recorder 12. While also this can be started from the system remote control signal transmitter CM3, in the present system, it can be started by depressing the recording key K3 or from the remote control signal transmitter for exclusive use.

Process F

The present process F is a process for executing the system feature of synchronous dubbing. In the present system, the feature is not available with the audio/visual selector 13 which serves as an audio/visual center equipment, and the unique feature control section of the control circuit 12CT of the video tape recorder 12 performs control of execution of the feature. Accordingly, upon execution of the feature, the video tape recorder 12 operates like an audio/visual center equipment.

First, the synchronous dubbing key KS of the video recorder 12 is depressed at step F1. The synchronous dubbing key KS is a key switch of the non-locking type, and each time this is depressed, starting and temporary stopping of synchronous dubbing are repeated alternately. When the key KS is depressed, the video tape recorder 12 determines at step F2 whether or not synchronous dubbing is being executed.

If synchronous dubbing is not being executed, the video tape recorder 12 inquires the audio/visual selector 13 serving as an audio/visual center equipment for a unit of equipment which is being input to the television receiver 11 to detect a dubbing source.

Subsequently, the video tape recorder 12 inquires the detected second equipment (in this instance, the multi-disk player 14), which serves as a dubbing source, for information of a synchronization time at step F4 to obtain information whether or not the second equipment is available for synchronous dubbing and what seconds are required for a synchronous time until the other equipment enters into a synchronous reproduction condition. Then, in accordance with the information, the video tape recorder 12 performs, at step F5, synchronous dubbing operation processing wherein a reproduction command to the second equipment and a recording command to the video tape recorder 12 itself are successively transmitted at suitable timings.

Where the second unit of equipment is not available for synchronous dubbing, the video tape recorder 12 executes its processing using a default value for a synchronization time of the second unit of equipment. Or else, a warning may be provided while execution of synchronous dubbing is stopped.

At step F6, during execution of synchronous dubbing, protection is performed so that, even if there is an operation input of the stop key Kst of the multi-disk player 14 or a key operation input of the video tape recorder 12, such input is ignored. The protection may be entrusted to the audio/visual center equipment 3 upon application.

When it is determined, as a result of determination at step F2 whether or not synchronous dubbing is being executed, that synchronous dubbing is being executed, the video tape recorder 12 controls the mechanism deck 12M so that it enters into a recording pause condition at step F7. Further, the video tape recorder 12 sends a command to the multi-disk player 14, and at step F8, the multi-disk player 14 enters into a reproduction pause condition. The multi-disk player 14 can enter from the pause condition into a reproduction condition, and a reproduction-in point from which it is desired to perform synchronous dubbing newly can be set. Thereafter, by operating the synchronous dubbing key KS, the process F described above is performed.

Thereafter, each time the synchronous dubbing key KS is operated, execution and temporary stopping of a dubbing operation are repeated. Such synchronous dubbing comes to an end, for example, by operating the stop key K4 after the processing at steps F7 and F8.

Having now fully described the invention, it will be apparent to one of ordinary skill in the art that many changes and modifications can be made thereto without departing from the spirit and scope of the invention as set forth herein.

What is claimed is:

1. In a remote control method for an electronic equipment system which includes a plurality of units of electronic equipment each including a remote control reception center and a microcomputer for controlling operation of the respective electronic equipment, the microcomputers of said electronic equipment being connected to each other by way of a bus system, and at least one remote control transmission unit, the improvement comprising the steps of: providing an electronic center equipment to control said electronic equipment system in a concentrated manner; causing said electronic center equipment to receive at the respective remote control reception section remote control signals in a concentrated manner without causing the remote control signal reception sections of said electronic equipment other than said electronic center equipment to function; transferring a command from said electronic center equipment to said electronic equipment; and wherein, upon initialization when each unit of said electronic equipment is connected by way of said bus system, said electronic center equipment inhibits functioning of the respective remote control signal reception sections of the other units of electronic equipment.

2. A remote control method for an electronic equipment system according to claim 1, further comprising: receiving a command peculiar to each unit of said electronic equipment from the remote control signal transmission unit provided for exclusive use with the electronic equipment; and decoding the received command in said electronic center equipment, and when a remote control signal transmission unit of a relevant one of said electronic equipment is executing another feature, said electronic center equipment develops a warning indicative thereof.

3. A remote control method for an electronic equipment system according to claim 1, further comprising: receiving a command peculiar to each unit of said electronic equipment from the remote control signal transmission unit provided for exclusive use with the electronic equipment by said electronic center equipment; decoding the command in the electronic center equipment; and transferring the decoded command to a relevant one of said electronic equipment.

4. A remote control method for an electronic equipment system according to claim 3, wherein each unit of said electronic equipment outputs one of a video and an audio signal.

5. A remote commander apparatus for controlling an electronic equipment system which includes a plurality of units of electronic equipment each including a remote control reception section and a microcomputer for controlling operation of the electronic equipment, the microcomputers of said electronic equipment being connected to each other by way of a bus system, comprising:

an electronic center equipment for controlling said electronic equipment system in a concentrated manner, said electronic center equipment including means for receiving remote control signals in a concentrated manner without causing said remote control signal reception sections of said electronic equipment other than said electronic center equipment to function and transfer commands to said electronic equipment, wherein, upon initialization when each unit of said electronic equipment is connected by way of said bus system, said electronic center equipment includes means for inhibiting functioning of the remote control signal reception section of the electronic equipment.

6. A remote commander apparatus for controlling an electronic equipment system according to claim 5, wherein each unit of said electronic equipment outputs one of a video and audio signal.

7. A remote commander apparatus for controlling an electronic equipment system according to claim 6, wherein one of said units of electronic equipment is one of a tape recording and/or reproduction apparatus and a disk recording and/or reproduction apparatus.

8. A remote commander apparatus for controlling an electronic equipment system according to claim 7, wherein said electronic equipment includes a disk apparatus which transfers a signal and a tape apparatus which records the signal from said disk apparatus.

9. A method of operating an electronic equipment which is included in and controlled by an electronic equipment system which includes, in addition to said electronic equipment, a plurality of second units of electronic equipment and electronic center equipment for controlling said electronic equipment system in a concentrated manner, each unit of said electronic equipment, and said second units of electronic equipment and said electronic center equipment including a remote control signal reception section and a microcomputer for controlling operation of the electronic equipment, the microcomputers of the electronic equipment being connected to each other by way of a bus system, the improvement comprising the steps of: rendering inoperative the remote control signal reception sections of said electronic equipment and said second units of electronic equipment while only said electronic center equipment is rendered operative to receive remote control signals in a concentrated manner; transferring a required command to said electronic equipment and said second electronic equipment; and, upon initialization when said electronic equipment is connected by way of said bus system, said electronic center equipment inhibits functioning of the remote control signal reception section of said electronic equipment.

10. An electronic equipment system according to claim 9, wherein a command peculiar to said electronic equipment from remote control signal transmission means provided for exclusive use with said electronic equipment is received and decoded by said electronic center equipment and transferred to a relevant one of said second electronic equipment when necessary.

11. An electronic equipment system according to claim 9, wherein a command peculiar to said electronic equipment from remote control signal transmission means provided for exclusive use with said electronic equipment is received and decoded by said electronic center equipment, and when the remote control signal transmission means of a relevant one of said electronic equipment and said second electronic equipment are executing another feature, said electronic center equipment develops a warning indicative thereof.

12. An electronic equipment system according to claim 10, wherein each of said units of electronic equipment outputs one of a video signal and an audio signal.

* * * * *